United States Patent [19]

Mauchle

[11] Patent Number: 5,735,958
[45] Date of Patent: Apr. 7, 1998

[54] ELECTROSTATIC COATING SYSTEM

[75] Inventor: Felix Mauchle, Abtwil, Switzerland

[73] Assignee: Gema Volstatic AG, Switzerland

[21] Appl. No.: 620,668

[22] Filed: Mar. 26, 1996

[30] Foreign Application Priority Data

Mar. 27, 1995 [DE] Germany .................. 195 11 255.5

[51] Int. Cl.[6] .............................. B05B 5/025; H05B 1/00
[52] U.S. Cl. .......................... 118/621; 361/225; 361/228
[58] Field of Search ........................... 361/225–229; 118/621, 663, 712; 363/59

[56] References Cited

U.S. PATENT DOCUMENTS 4,000,443 12/1976 Lever ........................................ 361/228

FOREIGN PATENT DOCUMENTS

| 38168 | 3/1989 | Australia. | |
| 2704699 | 11/1994 | France | 118/621 |
| 1913890 | 10/1970 | Germany. | |
| 2125753 | 6/1972 | Germany. | |
| 650701 | 8/1985 | Switzerland. | |

Primary Examiner—Donald E. Czaja
Assistant Examiner—Calvin Padgett
Attorney, Agent, or Firm—MacMillan, Sobanski & Todd

[57] ABSTRACT

Electrostatic spray coating system which accurately determines the actual value of a high voltage present on at least one high voltage electrode as coating material is electrostatically charge. A control or input voltage is measured on the input of a voltage transformer and multiplier circuit and is multiplied by the voltage multiplication factor of the voltage transformer and multiplier circuit, thereby calculating the theoretical or no load value of the voltage on the high voltage electrode. This theoretical value deviates from the actual value of the electrode voltage by the amount of the internal voltage drop across the voltage transformer and multiplier circuit when a current flows in it. The internal voltage drop is determined as a function of the electrode current and is subtracted from the theoretical value in order to generate a signal voltage corresponding to the actual value of the electrode high voltage. The signal voltage is subtracted from a desired value voltage in order to generate a regulating differential voltage for a controller which, in response thereto, regulates the electrode voltage and available power.

5 Claims, 3 Drawing Sheets

ELECTROSTATIC COATING SYSTEM

TECHNICAL FIELD

The invention relates to an electrostatic spray coating system and more particularly to an electrostatic spray coating system which provides an accurate determination of the high voltage present at a material charging electrode for use in regulating the voltage and power available at the electrode.

BACKGROUND ART

An electrostatic spray gun for spray coating of articles with coating powder or coating liquid is known wherein the spray gun includes electrodes for imparting an electrostatic charge to the sprayed material and a lamp which lights up whenever a specific electric voltage for high voltage electrodes is available. The level of the high voltage is not measured or displayed. The spray gun contains a high voltage generator composed of a transformer and a voltage multiplier or cascade circuit according to "Greinacher" which generates the voltage for the electrodes. The secondary side of the transformer is connected to the voltage multiplier circuit while its primary side receives a low AC voltage from a suitable source. The low AC voltage is generated in practice typically by an oscillator, which may be arranged either in the gun or externally to the gun. High voltage generators of this type are well known.

With an increasing current at the high voltage electrode (s), maintaining a consistently high DC voltage on the high voltage electrode(s) requires raising the input voltage to the high voltage generator. The output power of the high voltage generator corresponds to the mathematical product of the voltage and the current. Exceeding a certain level of electric output power gives rise to the risk of electric are overs to the article being coated or to system parts or persons. For that reason it is known to provide the high voltage generator with an output limiting circuit. Beginning with a specific output power, the output limiting circuit reduces the voltage in response to current increases, thereby limiting the output power. Determining the energy requires determining the current and the voltage at the high voltage electrode(s). In the past, the voltage between the high voltage electrode and ground potential was measured only in no load operation, with the voltage turned on but no coating material being sprayed, since the coating material would otherwise soil the measuring device and the spray pattern on the article being coated would be disturbed by the measuring device. Therefore, the customary procedure is measuring the input voltage to the high voltage generator and multiplying it by the voltage multiplication factor to arrive at the theoretical voltage of the high voltage (HV) electrodes. The prior art proposes measurement of the electrode current by measuring the current flowing from the article being coated to ground. This current corresponds to the current flowing from the HV electrode across the air gap to the article being coated and then from the article to ground. But this type of electric current measurement is unwieldy and very inaccurate, since the current is very small.

None of the prior art spraying systems allows for the fact that measuring the input voltage of the high voltage generator and multiplying it by the voltage multiplication factor determines only the theoretical value of the electrode voltage in no load operation. However, the calculated value is incorrect during the spraying operation. In spraying, an electric current flows in the high voltage generator and causes a voltage drop due to the internal resistance in the high voltage generator. The value of the calculated theoretical electrode voltage is lower than the actual electrode voltage by the amount of the voltage drop in the high voltage generator.

Studies in conjunction with the invention have revealed that with the prior methods that measure the input voltage of the high voltage generator and multiply it by a voltage multiplication factor, the voltage on the electrodes as calculated thereof is wrong by up to 30%.

DISCLOSURE OF INVENTION

The invention sets out to accomplish the objective of determining in a simple manner at any time, in no load operation and also during spraying, the actual value of the voltage on the HV electrode(s). The actual output voltage is determined more accurately than in the past. This allows a more precise control over the maximum output power at the HV electrodes which charge the coating material. It also permits more precise control of the voltage on the electrode (s) for different coating materials and different types of coating or coating thicknesses.

According to the invention, the no load or theoretical electrode voltage is determined from the output voltage of the oscillator which is applied to the voltage multiplier and the voltage multiplication factor of the transformer and the voltage multiplier circuit. This voltage is correct only when there is no electrical load on the electrode, i.e., when no coating material is discharged from the spray gun. The internal resistance of the high voltage power generator, as seen at the electrode, is measured while the high voltage is turned off. During operation of the spray gun, the electric current to the electrode is measure and multiplied time the previously measured internal resistance to obtain the voltage drop across the high voltage generator. This value is subtracted from the calculated theoretical or no load voltage to obtain an accurate measurement of the actual electrode voltage. The measured actual electrode voltage is then used in regulating the electrode voltage during spraying and in limiting the power available at the high voltage electrode.

Accordingly, it is an object of the invention to provide an improved electrostatic coating system.

Other objects and advantages of the invention will become apparent from the following detailed description of the invention and the accompanying drawings.

BEST MODE FOR CARRYING OUT THE INVENTION

An electronic control circuit according to the invention allows, in a simple manner, the automatic measurement and control of the relevant actual value of the DC high voltage on the high voltage electrode (or high voltage electrodes, in case of using several) in an electrostatic coating system. The voltage is accurately measured and controlled irrespective of whether the distance between high voltage electrode and articles being coated changes, irrespective of changes of the electrical resistance between the article being coated and ground potential, irrespective of changes of the electrical resistance of the coating material on the article being coated as the film thickness or properties of the coating material change, and irrespective of the quantity coating material being sprayed.

1. High voltage Generator

Figure 1:
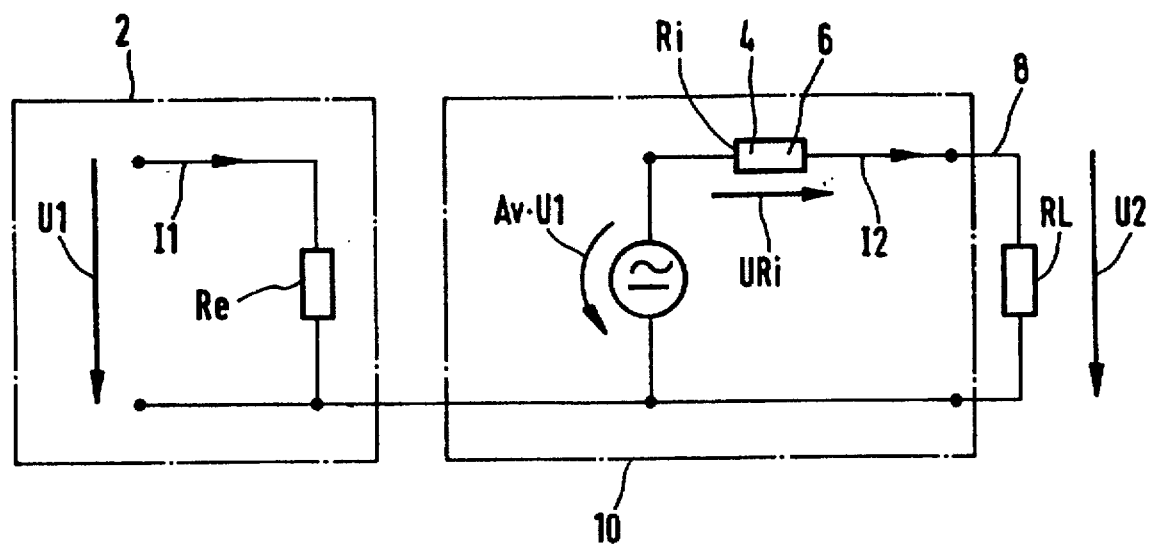
FIG. 1 is an equivalent circuit diagram for a high voltage generator of an electrostatic spray coating system according to the invention.
Figure 2:
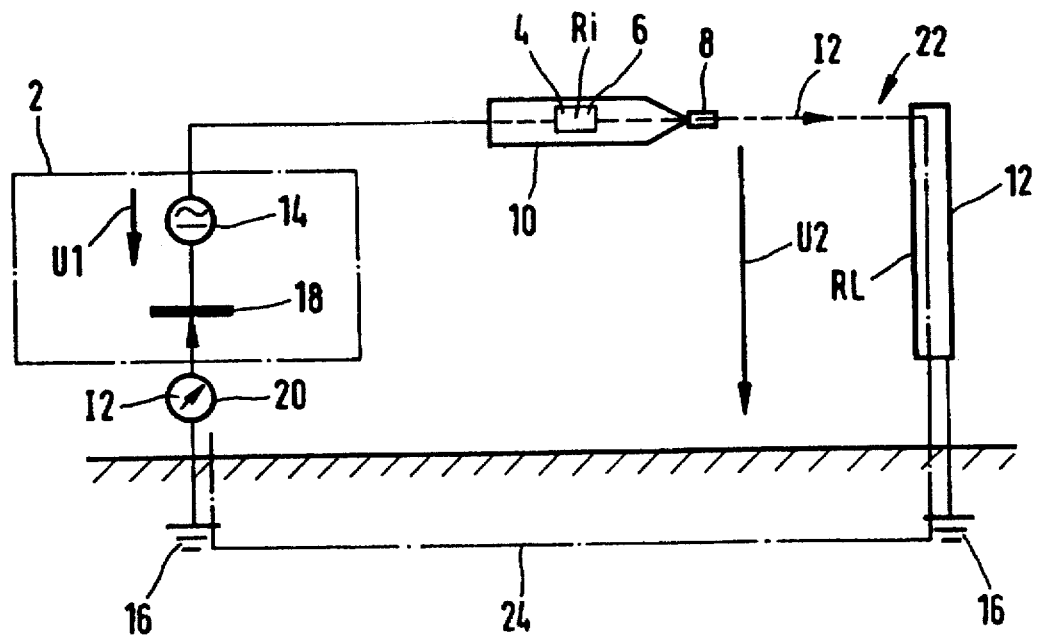
FIG. 2 is a schematic diagram of an electrostatic spray coating system according to the invention, with a high voltage generator and electronic compensation for the voltage drop in the high voltage generator.

According to FIG. 1, a high voltage generator may be viewed as a controllable voltage supply consisting of an oscillator 2, a transformer 4, and a voltage multiplier circuit 6 for generating and applying a required DC high voltage to at least one HV electrode 8 of a spray device 10. The spray device 10 may be a hand held spray gun or an automatic gun supported by a machine, or a so called rotary atomizer or any other form.

Viewing the high voltage generator according to FIG. 1 as a voltage controlled DC voltage supply, the input voltage is then an alternating voltage, and the output voltage is a DC voltage which is generated by the voltage multiplier circuit 6. The definitions applicable to the equivalent circuit diagram of FIG. 1 for the high voltage generator are:

U1: input voltage or control voltage to the oscillator 2;

U2: high voltage between the electrode 8 and ground potential,

I1: electric current in the oscillator 2;

I2: output current of the high voltage generator (electric current or ground current from the HV electrode 8 to ground potential);

Av: factor by which the transformer 4 and the voltage multiplier circuit 6 increase (multiply) the AC low voltage U1 of the oscillator 2 to establish the high DC voltage U2;

Re: internal resistance of the oscillator 2.

Ri: internal electrical resistance of the spray device 10, measured on the output end of the voltage multiplier circuit between the HV electrode 8 and ground potential;

RL: load resistance (the electric resistance of the air gap between the HV electrode 8 and an article being coated, the electric resistance of the article being coated and of the growing coating applied on it and the electric resistance from the article being coated to ground potential);

The equation for the voltage transfer is

*Equation 1:* $U2 = Av*U1 - Ri*I2$

Equation 1 shows that based on the internal resistance Ri of the voltage controlled DC voltage supply, depending on the magnitude of I2, the electrode voltage drops by a voltage URi.

2. Measuring the DC Voltage on the HV Electrode 2. 1 Conventional Method

To measure the actual voltage on the HV electrode 8, the voltage U2 of FIG. 1 needs to be measured. During the spraying operation, this measurement can not be carried out on the HV electrode 8 from outside the spray device 10. Measuring the voltage U2 on the HV electrode 8 from within the spray device 10 requires electrical resistors and forming a reference potential, so that the voltage drop can be measured via the internal electrical resistors arranged as a voltage divider. Incorporating such additional internal resistors for voltage measurement entails the following disadvantages: additional weight of the spray device 10, additional space needs for the internal resistors in the spray device 10, additional cost for the internal resistors and with existing spray devices or guns, and the impossibility of retroactively integrating internal resistors. Thus, it was not possible for exact measurement and/or control of the electrode voltage.

2. 2. Ri Compensation Method

The invention is directed to a method considerably simpler than the conventional method for determining the electrode voltage. The internal resistance Ri of the high voltage circuit in the spray device 10 is compensated for in determining the electrode voltage. In Ri compensation, the actual electrode voltage U2 is calculated according to equation 1, without requiring a separate voltage measuring resistor in the spray device 10. The values Av, U1, Ri and I2 are needed for calculating the electrode voltage U2. The factor Av is determined from the winding ratio (primary side to secondary side) of the transformer 4 and the number of cascade stages in the voltage multiplier circuit 6. The internal resistance Ri of the spray device 10 can be measured, and thus determined initially for any spray device, using known measuring methods. The measuring proceeds quasi backward, into the spray device 10, by connecting a resistance measuring instrument between the HV electrode 8 and ground potential. The output current (ground current) 12 and input control voltage U1 can be continuously measured during operation of the spray device 10 using conventional measuring instruments and techniques.

In place of the equivalent circuit shown in FIG. 1, the real components illustrating the Ri compensation method are shown in FIG. 2. FIG. 2 schematically shows an article 12 being coated, a high voltage supply 14, ground potential 16, an electric reference potential 18 differing from ground potential 16, and an electric meter 20 for measuring the output current I2 flowing from the HV electrode 8. The current flows via air gap 22 to the article 12 being coated, then via a conveyer or suspension device (not shown) which carries the article being coated, then to ground potential 16, and then from ground potential through the ammeter 20 to the reference potential 18. The output or ground current, is schematically illustrated in FIGS. 2, 3, 4 and 5 by double dot dash line.

Reference 14 represents symbolically the high voltage supply consisting of the oscillator, the transformer 4 and the voltage multiplier circuit 6. The article 12 being coated, with the coating formed on it, and the air in the air gap 22 contained between the HV electrode 8 and the article 12 being coated forms the electric load resistance RL. The internal resistance Ri of the spray device 10 is the resistance that can be measured, backward into the spray device 10, between the HV electrode 8 and a second reference potential, normally the ground potential 16. The voltage supply 14 represents the input or control voltage U1 of the equivalent circuit relative to FIG. 1.

3. High voltage Measurement with Ri Compensation

With reference to the block diagram of FIG. 3, the following illustrates the voltage measurement with Ri compensation. The output current (ground current) 12 is measured in an electronic control circuit 30 by an output voltage measuring component 32 and is multiplied electronically by the internal resistance Ri of the spray device 10. The output voltage component 32 generates from the multiplication product a voltage drop signal 34 that corresponds to the internal voltage drop $URi=I2*Ri$ across the device internal resistance Ri of the spray device 10.

The input or control voltage U1 is measured by an input voltage measuring component 36 at the output of the oscillator 2 and is multiplied by the voltage multiplication factor Av. The resulting multiplication product U1*Av corresponds to the voltage at the electrode 8 when there is no high voltage current flow I2. The input voltage measuring component 36 generates an input voltage signal voltage 38. An actual value differential circuit 40 subtracts the voltage drop signal voltage 34 from the signal voltage 38 and generates a difference signal voltage 42 which in any situation of operation, with and without spraying operation under way, corresponds to the relevant HV actual value U2 on the HV electrode 8.

This type of high voltage measurement with Ri compensation has the following advantages: there is no measuring resistor needed in the spray device 10; existing spray devices 10 in which a measuring resistor cannot be integrated can nonetheless be improved according to the invention in such a way that an exact voltage determination and voltage control is possible, since the Ri compensation requires no measuring resistor in the spray device; and it is low cost and functionally reliable.

4. High voltage Control with Ri Compensation

Figure 3:
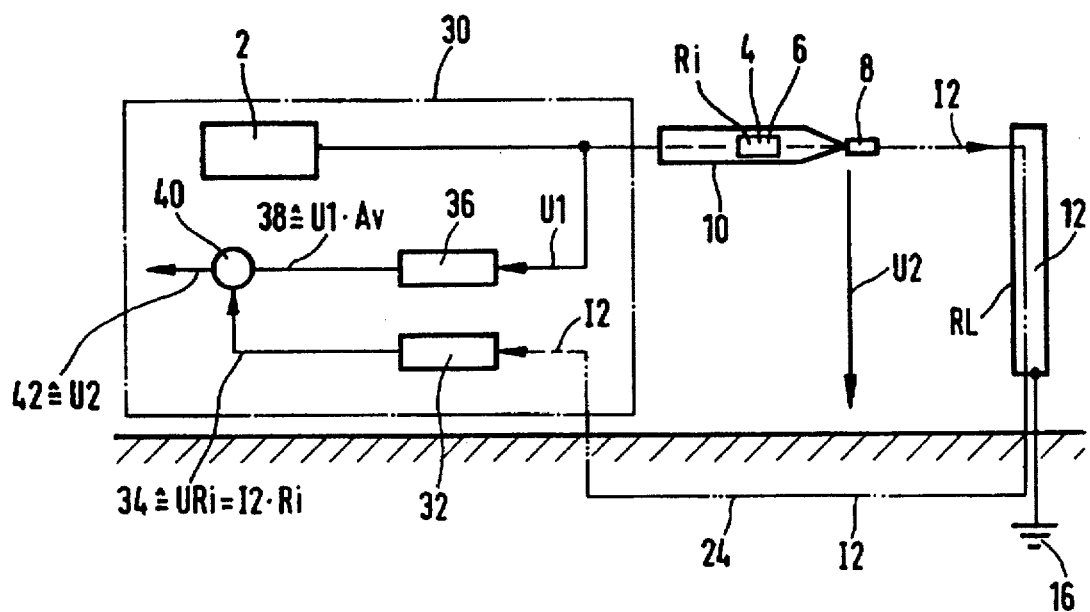
FIG. 3 is a schematic diagram of an electrostatic spray coating system with an electronic control circuit for compensation for the voltage drop in the high voltage generator.
Figure 4:
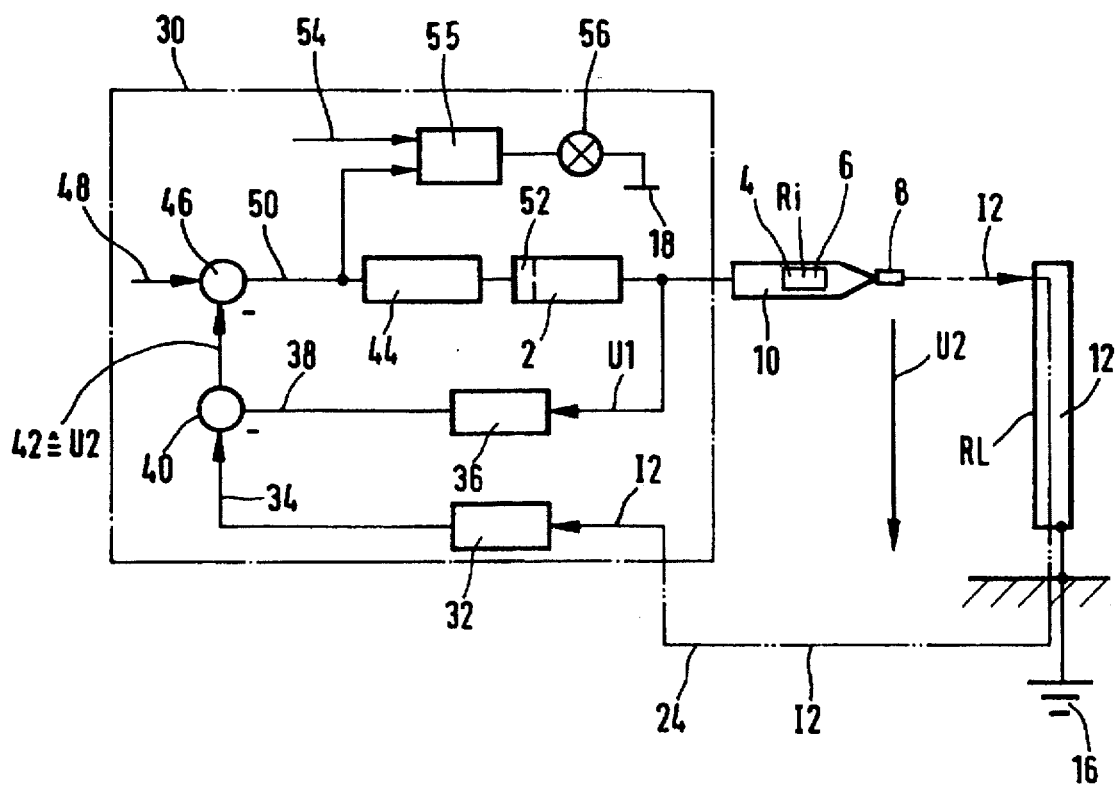
FIG. 4 is a schematic diagram of an electrostatic spray coating system with an electronic control circuit for compensation for the voltage drop in the high voltage generator and control of the electrode voltage.

To maintain a selected electrode voltage at the desired level, the electrode voltage is determined with the Ri compensation circuit described above and is passed on to a controller 44 for controlling the electrode voltage according to FIG. 4. The voltage control is illustrated in the block diagram relative to FIG. 4. Corresponding to the electrode voltage U2, the HV actual value 42 is measured as described above with reference to FIG. 3 and is subtracted by a set value differential circuit 46 from a high voltage set value 48 to form a control differential voltage 50. The control differential voltage 50 is fed to the input of the controller 44, which generates, as a function of the control differential voltage 50, the required control voltage for the oscillator 44 in order to establish the desired voltage set value U2 on the HV electrode 8.

5. Output Limitation Display

The voltage generator, consisting of the oscillator 2, the transformer 4 and the voltage multiplier circuit 6, must not exceed a specific output power limit (energy limit) in accordance with various safety provisions. The power limit is for reasons of protection from personal injury and dust or vapor explosion hazard. For compliance with these provisions, output power limiting circuits are employed which are generally known. Their configuration is such that the electrode voltage is reduced as the electrode current increases. The voltage reduction is in keeping with increasing electrode current in order to maintain the prescribed energy limit. This means that the energy, or output power, of the spray device 10 is being utilized in accordance with a voltage current characteristic. A circuit is known in the prior art which, depending on an operating point deriving from the electrode current I2 and the load resistance RL, detects the arrival at and the entrance in the energy limitation range and indicates it optically, acoustically or in another manner. The invention proposes a simple and reliable circuit which allows determining for each detection of entering an output limitation the maximum possible electrode voltage that will not lead to an output limitation. The advantage thereof is that the electrode voltage can be used as a reproducible parameter in assessing the coating result.

FIG. 4 illustrates schematically the output limiting circuit 52 as a component of the electronic control circuit 30. From the block diagram of the voltage controller relative to FIG. 4, it follows that the control differential voltage 50 is a subtraction of the electrode voltage actual value 42 from the electrode voltage set value 48, or is a signal voltage that corresponds to this difference. The output limiting circuit 52 may be located in the oscillator 2. As the electrode current I2 rises to a level where the output limitation sets in, the output limiting circuit 52 reduces the voltage U2 on the I—IV electrode 8 at continued rise of the electrode current, or output current (ground current) I2 in such a way that the output is kept to the permissible output power, or energy limit value. Since the electrode actual voltage value 42 is determined, the voltage reduction is automatically detected as well. When the output limiting circuit becomes effective this way, the voltage on the I—IV electrode 8 is automatically pushed below the HV set value 48. This makes the control difference voltage 50 positive. The controller 44 now tries in vain to raise the voltage U2, since the output limiting circuit 52 prevents a voltage increase. Hence, the control difference signal voltage 50 remains positive.

According to the invention, the control differential signal voltage 50 is fed not only to the controller 44, but also to an electronic comparator circuit 55 that compares it to a preset reference voltage 54. If the control differential sisal voltage 50 is greater than the reference voltage 54, the comparator circuit 55 activates a display thereby indicating that the HV generator is operating within the range of output limitation. The display 56 is preferably a lamp or light emitting diode, but it might as well be an acoustic or optical display indicator. The reference voltage 54 may be the reference potential 18 or ground potential 16. Thus, the comparator circuit 55 needs to be activated or cut in automatically only whenever the output power or energy limit is reached or exceeded. This will alert an operator of the spray device 10 that the high voltage on the electrode 8 is below the set value and, consequently, that the quality of the applied coating may be less than desired.

Figure 5:
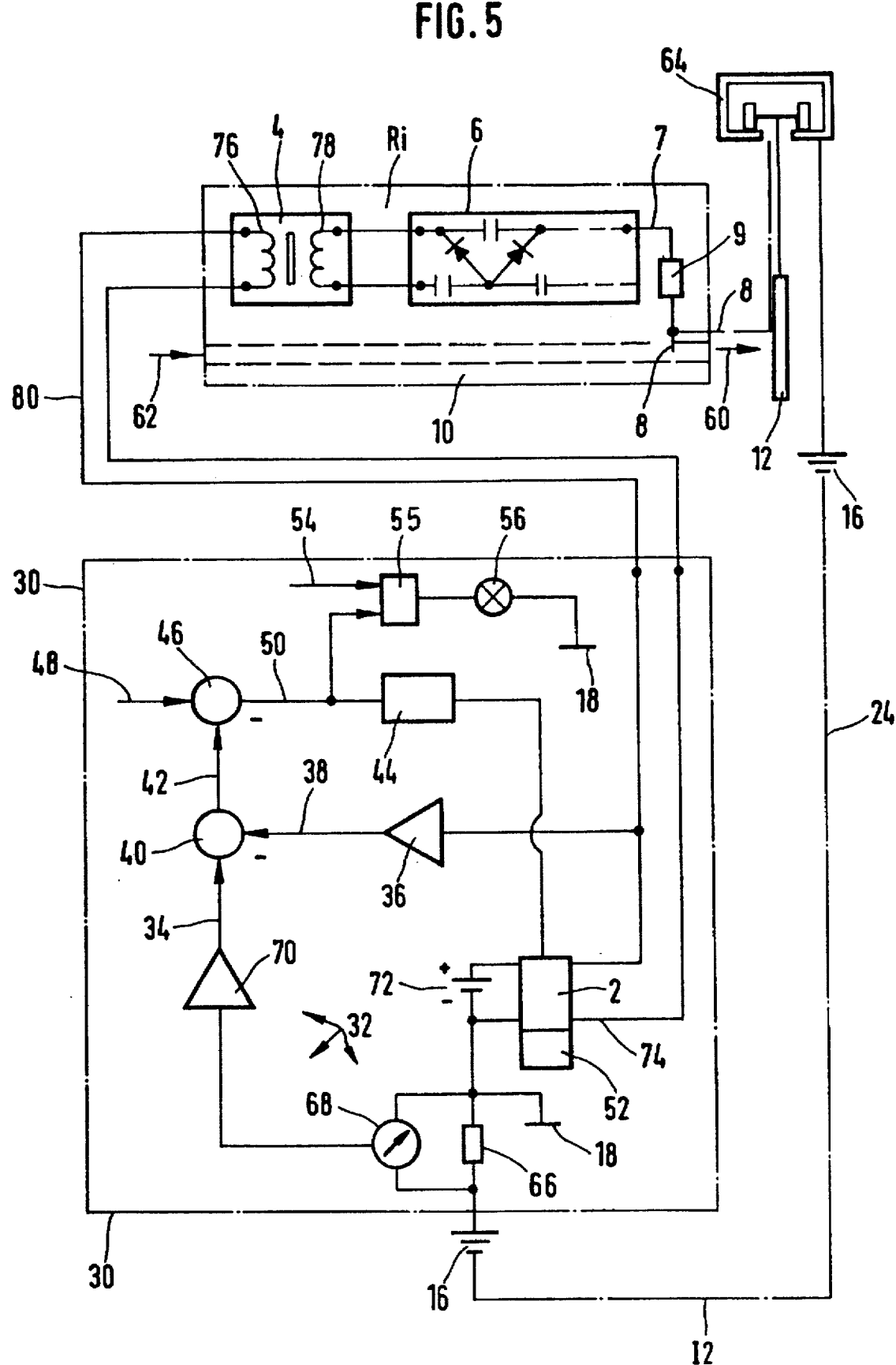
FIG. 5 is a schematic diagram of an electrostatic spray coating system, similar to FIG. 4, and with further details illustrated.

FIG. 5 shows the electronic spray coating system relative to FIG. 4 in greater detail and employed for spray coating of an article 12 with a coating powder 60. The coating powder 60 is fed to one end of the spray device 10 by means of a line 62 and is sprayed from the other end of the device 10 onto the article 12 being coated. The article 12 is supported on a carrier 64 which, for example, may be a conveyer system which gradually moves a series of articles 12 past the spray device 10. The conveyer 64 is grounded at 16. The transformer 4 and voltage multiplier circuit 6 are contained in the spray device 10. The voltage multiplier circuit 6 preferably is a cascade circuit formed from a plurality of capacitors and rectifiers. A current limiting resistor 9 may be contained in the electrical connection 7 between the high voltage output of the voltage multiplier circuit 6 and the HV electrode 8. The current limiting resistor 9 forms a part of the internal resistance Ri of the spray device 10, since it is measured automatically in measuring the internal resistance Ri between the HV electrode 8 and ground potential 16. Instead of one HV electrode 8, several HV electrodes 8 may be present. FIG. 5, for example, shows two HV electrodes 8, one internal to the spray device 10 and one extending external to the spray device 10.

According to FIG. 5, the input voltage measuring component 36 may be an amplifier circuit. According further to FIG. 5, the output voltage measuring component 32 may include an electrical measuring resistor 66 connected between ground potential 16 and the reference potential 18. The output current I2 passes through the resistor 66 and a voltage drop occurs across the resistor 66 which is directly proportional to the current I2. An electric voltage measuring element 68 measures the voltage drop across the measuring resistor 66, and an amplifier 70 that amplifies the measured voltage. The amplifier 70 generates on its output the differential signal voltage 34 corresponding to the voltage drop across internal resistance Ri of the spray device 10. The oscillator 2 is connected on its input end to a low voltage DC voltage supply 72 and generates on its output end 74 a relatively low voltage alternating voltage for driving the primary coil 76 of transformer 4. A substantially higher AC voltage is created on the secondary coil 78 of transformer 4. The voltage multiplier circuit 6 converts the secondary AC voltage to a considerably higher DC voltage for the electrode 8. The electrode voltage preferably is between 4 kV and 140 kV. Identical parts are referenced identically in all of the drawing figures, for which reason the remaining components of FIG. 5 matching components of other figures are not described separately.

According to the illustrated embodiments, the oscillator 2 for the high voltage generator is located in the electronic control circuit 30 and is contained in a control cabinet separate from the spray device 10. The oscillator 2 connects via electric lines 80 to the primary coil 76 of transformer 4 which preferably is located with the voltage multiplier circuit 6 in the spray device 10. Along with the transformer 4, the oscillator 2 forms an oscillator circuit. According to a modified embodiment, however, a self vibrating oscillator 2 could be used as well. According to a further modified embodiment, the transformer 4 and/or the voltage multiplier circuit 6 may be integrated in the electronic control circuit 30 and may be accommodated in a control cabinet separate from the spray device 10. In another embodiment it is possible to accommodate the oscillator 2, in addition to transformer 4 and voltage multiplier circuit 6, in the spray device 10. According to a further modified embodiment it also would be possible to locate further components, or all components, of the electronic control circuit 30 in the spray device, in addition to transformer 4 and voltage multiplier circuit 6.

The transformer 4 preferably has an adjustable effective voltage ranging between 0 and 60 volts on its primary side connected to oscillator 2 and has on its secondary side an adjustable effective voltage ranging between 0 and 20 kilovolts. The DC voltage on electrode 8 preferably ranges between 10 kilovolts and 140 kilovolts during spraying.

It will be appreciated that various modifications and changes may be made to the above described preferred embodiment of without departing from the scope of the following claims. Although the preferred embodiment has been described for applying a coating powder, the invention is also applicable to apparatus for electrostatic application of coating liquids.

I claim:

1. Electrostatic spray coating apparatus including a spray device for spraying coating material onto an article which is electrically connected to ground potential, said spray device having at least one high voltage electrode adapted to impart an electrostatic charge to the sprayed material, a high voltage generator which includes a voltage transformation circuit adapted to convert a relatively low AC voltage applied to an input circuit to a high DC voltage in an output circuit which is applied to the electrode, said voltage transformation circuit having a predetermined voltage multiplication factor and said output circuit having a predetermined internal resistance, characterized in that said apparatus includes means for measuring the level of the relatively low AC voltage applied to the input circuit, means for measuring electric current in the output circuit, means for generating an input voltage signal which is a function of the product of the measured low AC voltage times the predetermined voltage multiplication factor, means for generating a voltage drop signal which is a function of the product of the measured current in the output circuit and the predetermined internal resistance of said output circuit, and means responsive to a difference between the input voltage signal from the input voltage signal generating means and the voltage drop signal from the means for generating a voltage drop signal for determining the actual voltage on the high voltage electrode.

2. Electrostatic spray coating apparatus, according to claim 1, and further including differential circuit means for establishing a voltage differential signal in response to the difference between the determined actual electrode voltage from said means for determining the actual voltage and a desired electrode voltage, and voltage adjusting means responsive to said voltage differential signal from said differential circuit means for adjusting the low AC voltage to regulate the high DC voltage on the electrode.

3. Electrostatic spray coating apparatus, according to claim 2, and further including power limiting circuit means responsive to the measured current in the output circuit and to the determined actual voltage on the high voltage electrode from said means for determining the actual voltage for controlling the high DC voltage at the electrode to limit power at the high voltage electrode to no greater than a predetermined maximum power level, said power limiting circuit means causing a decrease in the high DC voltage at the electrode in response to current demands for power greater than the predetermined maximum power level.

4. Electrostatic spray coating apparatus, according to claim 3, and wherein said power limiting circuit means includes a power comparing circuit means for generating a power differential signal in response to a difference between the power at the electrode and a reference power signal, and means responsive to the power differential signal from said power comparing circuit means for preventing said voltage adjusting means from increasing the voltage at the electrode in response to the voltage differential signal.

5. Electrostatic coating apparatus, according to claim 4, and further including means responsive to the voltage differential signal from said differential circuit means for indicating when said voltage adjusting means is prevented from increasing the voltage at the electrode in response to the voltage differential signal.

* * * * *